Patented July 12, 1932

1,867,439

UNITED STATES PATENT OFFICE

GÉRALD BONHÔTE, OF BASEL, SWITZERLAND, ASSIGNOR TO THE FIRM OF SOCIETY OF CHEMICAL INDUSTRY IN BASLE, OF BASEL, SWITZERLAND

AZO-DYESTUFFS AND PROCESS OF MAKING SAME

No Drawing. Application filed July 14, 1930, Serial No. 467,957, and in Switzerland July 18, 1929.

The present invention relates to the manufacture of new azo-dyestuffs which are particularly valuable for producing fast tints on the fiber. It comprises the new products, their process of manufacture, and the material which has been dyed with the new products.

According to this invention very valuable new dyestuffs are made by coupling an arylide of 2:3-hydroxynaphthoic acid with a diazo-compound of the general formula

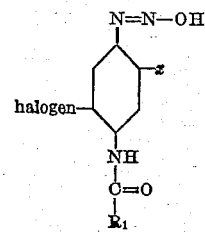

in which $x$ represents halogen, an alkyl-group or an alkoxy-group, and $R_1$ an aryl nucleus of the benzene series. The new products, which correspond with the general formula

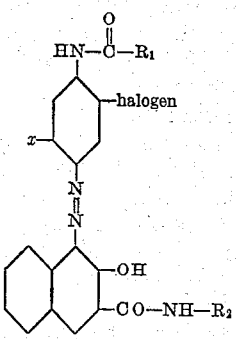

in which $x$ stands for halogen, alkyl or alkoxy, $R_1$ for an aryl nucleus of the benzene series, and $R_2$ for an aryl nucleus of the benzene or of the naphthalene series, are in the form of powders, red to Bordeaux and violet dyestuffs. When these dyestuffs are produced on the fiber they show the above tints which are distinguished by their vividness and excellent fastness properties, particularly to chlorine and kier boiling.

The following examples illustrate the invention:—

Example 1

26 parts by weight of 1-amino-2-methyl-4-benzoyl-amino-5-chlorobenzene are diazotized as usual and the diazo-solution is introduced into one comprising 2000 parts of water, 31.3 parts of 2:3-hydroxynaphthoic acid β-naphthalide, 90 parts of caustic soda solution of 30 per cent strength and 100 parts of calcined sodium carbonate. The dyestuff of the formula

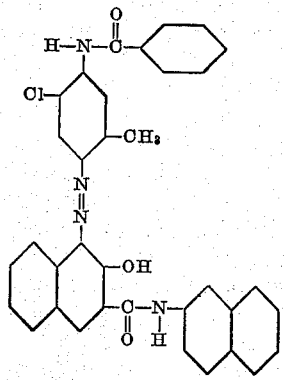

immediately separates in the form of a red precipitate; this is filtered and dried. It forms a dark red powder.

If the chlorine atom standing in the 5-position of the diazotizing component is replaced by a bromine atom, a similar dyestuff is obtained.

Example 2

Cotton yarn is impregnated with a grounding liquor made by dissolving 7 grams of the α-naphthalide of 2:3-hydroxynaphthoic acid in 300 cc. of hot water with addition of 15 cc. of caustic soda solution of 30 per cent strength and 15 cc. of Turkey red oil, the whole being made up to 1 litre. The yarn is then wound off and developed in a solution neutralized with sodium acetate and containing 4 grams of diazotized 1-amino-2-methyl-4-benzoylamino-5-chlorobenzene per litre. There is produced a pure Bordeaux tint of excellent properties of fastness. The formula of the formed dyestuff is

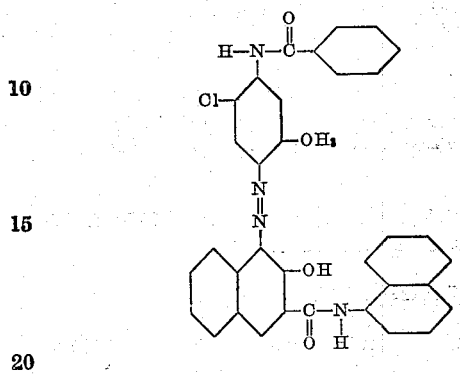

Further Bordeaux tints are obtained by use of other arylides of 2:3-hydroxynaphthoic acids, for example the anilide, the para-chloranilide, the β-naphthylamide, the ortho-toluidide, the 5-chloro-2-toluidide and the para-anisidide of 2:3-hydroxynaphthoic acid, whereas more yellow Bordeaux tints are obtained with the 4-chloro-2-anisidide, the ortho-anisidide and the ortho-chloranilide of 2:3-hydroxynaphthoic acid. In the diazotizing component the chlorine atom may be replaced by a bromine atom, or the residue of the benzoic acid by the residue of another aromatic carboxylic acid, such as a chlorobenzoic acid or a para- or meta-alkyloxybenzoic acid, such as para-methoxybenzoic acid.

*Example 3*

Cotton yarn is impregnated in a bath containing 8 parts of ortho-toluidide of 2:3-hydroxynaphthoic acid per litre. The yarn is cautiously wound off and developed in a solution neutralized with sodium acetate containing 5 grams of diazotized 1-amino-2:5-dichloro-4-benzoylamino-benzene per litre. Very pure red-blue tints are thus obtained which possess excellent fastness properties to chlorine, to fulling and to light. The dyestuff precipitated on the fiber corresponds with the formula

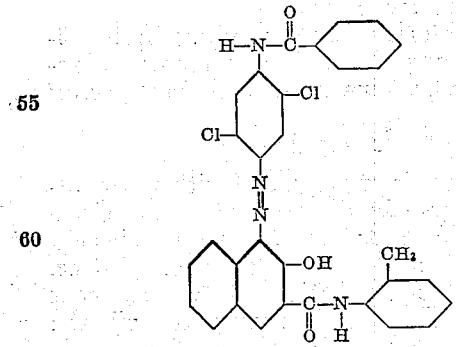

By replacing in this example the ortho-toluidide of 2:3-hydroxynaphthoic acid by the meta- or the para-toluidide or also by the para-anisidide, or by the 5-chloro-2-toluidide, red dyeings of the same shade are produced, whereas the use of arylides, such as the ortho-chloranilide or the 2:5-dichloranilide leads to more red-scarlet dyeings. Analogous products are obtained from diazotizing components in which the chlorine has been replaced by one or two bromine atoms.

*Example 4*

The material to be printed is padded with an alkaline solution containing per litre 12 grams of the para-chloro-anilide of 2:3-hydroxynaphthoic acid. After drying, the material is printed with a paste which contains per kilogram 7 grams of diazotized 1-methoxy-2-amino-4-chloro-5-benzoylamino-benzene. The deep, pure reddish violet dyestuff of the formula

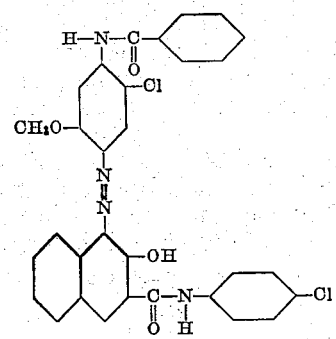

develops very quickly and is very fast.

In this case also like tints are obtained with other arylides of 2:3-hydroxynaphthoic acid, such as, for example, the α-naphthylamide, the anilide or the 5-chloro-2-toluidide of the 2:3-hydroxynaphthoic acid. The ortho-toluidide, the 4-chloro-2-anisidide and the para-anisidide lead to violets which are somewhat more red. Obviously the combinations of this example may be produced on yarn, just as the combinations of the preceding Examples 1 to 3 may be used for the dyeing of textile fabrics or for printing.

If the 1-methoxy-2-amino-4-chloro-5-benzoylamino-benzene is replaced by compounds such as, for example, 1-ethoxy-2-amino-4-chloro-5-benzoylamino-benzene or 1-ethoxy-2-amino-4-chloro-5-para-methoxy-benzoylamino-benzene, there are also obtained products yielding violet shades.

What I claim is:—

1. A manufacture of new azo-dyestuffs by coupling with an arylide of 2:3-naphthoic acid of the general formula

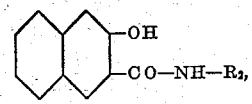

in which $R_2$ stands for an aryl nucleus of the benzene or of the naphthalene series, a diazo-compound of the general formula

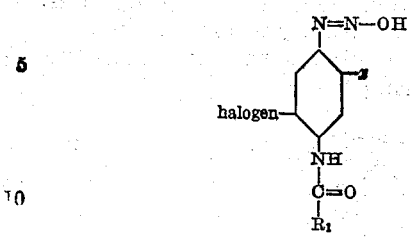

in which $x$ represents halogen, an alkyl-group or an alkoxy-group, and $R_1$ an aryl nucleus of the benzene series.

2. A manufacture of new Bordeaux to violet azo-dyestuffs by coupling with an arylide of 2:3-naphthoic acid of the general formula

in which $R_2$ stands for an aryl nucleus of the benzene or of the naphthalene series, a diazo-compound of the general formula

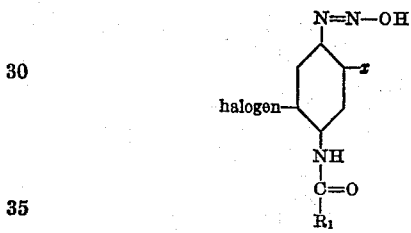

in which $x$ represents an alkyl- or an alkoxy-group, and $R_1$ an aryl nucleus of the benzene series.

3. A manufacture of new violet azo-dyestuffs by coupling with an arylide of 2:3-naphthoic acid of the general formula

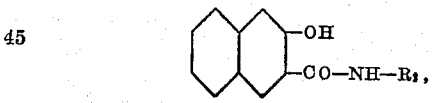

in which $R_2$ stands for an aryl nucleus of the benzene or of the naphthalene series, a diazo-compound of the general formula

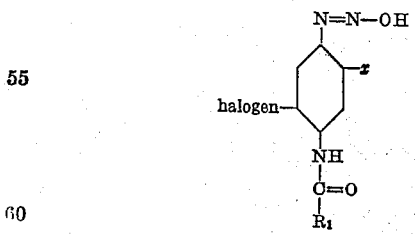

in which $x$ represents an alkoxy-group, and $R_1$ an aryl nucleus of the benzene series.

4. A manufacture of a new violet azo-dyestuff by coupling the para-chloranilide of 2:3-hydroxynaphthoic acid with the diazo-compound of the formula

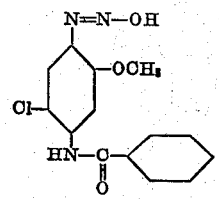

5. A manufacture of new azo-dyestuffs by coupling with an arylide of 2:3-naphthoic acid of the general formula

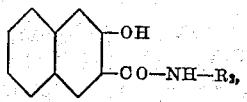

in which $R_2$ stands for an aryl nucleus of the benzene or of the naphthalene series, a diazo-compound of the general formula

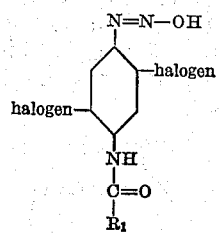

wherein $R_1$ stands for an aryl nucleus of the benzene series.

6. A manufacture of new azo-dyestuffs by coupling with an arylide of 2:3-naphthoic acid of the general formula

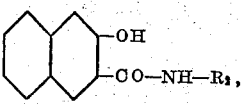

in which $R_2$ stands for an aryl nucleus of the benzene or of the naphthalene series, a diazo-compound of the general formula

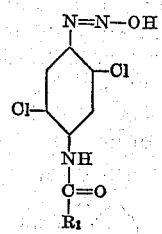

wherein $R_1$ stands for an aryl nucleus of the benzene series.

7. A manufacture of new azo-dyestuffs by coupling with a toluidide of the 2:3-naphthoic acid a diazo-compound of the formula

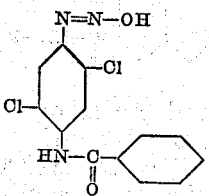

8. As new products the azo-dyestuffs of the general formula

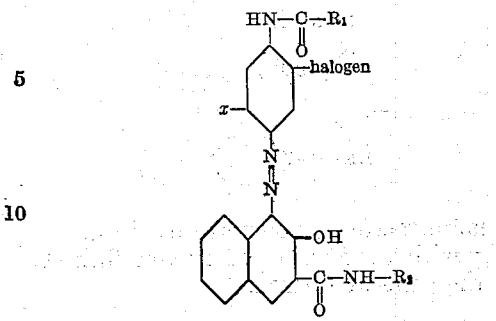

in which $x$ stands for halogen, alkyl or alkoxy, $R_1$ for an aryl nucleus of the benzene series, and $R_2$ for an aryl nucleus of the benzene or of the naphthalene series, which products form red Bordeaux and violet powders, yielding, when produced on the fiber, similar tints which are distinguished by their vividness and excellent fastness properties, particularly to chlorine and kier boiling.

9. As new products the azo-dyestuffs of the general formula

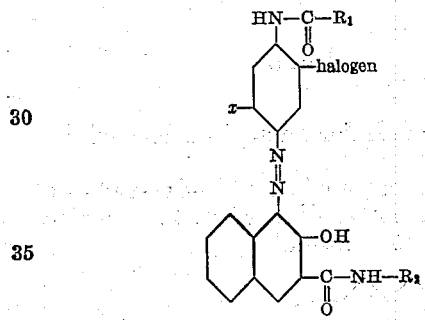

in which $x$ stands for alkyl or alkoxy, $R_1$ for an aryl nucleus of the benzene series, and $R_2$ for an aryl nucleus of the benzene or of the naphthalene series, which products form Bordeaux and violet powders, yielding, when produced on the fiber, similar tints which are distinguished by their vividness and excellent fastness properties, particularly to chlorine and kier boiling.

10. As new products the azo-dyestuffs of the general formula

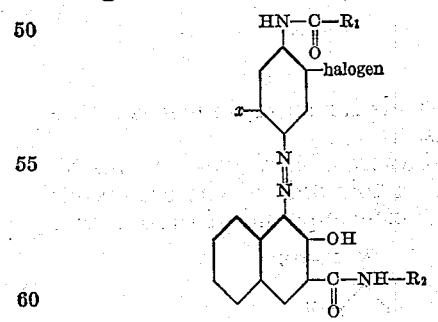

in which $x$ stands for alkoxy, $R_1$ for an aryl nucleus of the benzene series, and $R_2$ for an aryl nucleus of the benzene or of the naphthalene series, which products form violet powders, yielding, when produced on the fiber, similar tints which are distinguished by their vividness and excellent fastness properties, particularly to chlorine and kier boiling.

11. As a new product the violet azo-dyestuff of the formula

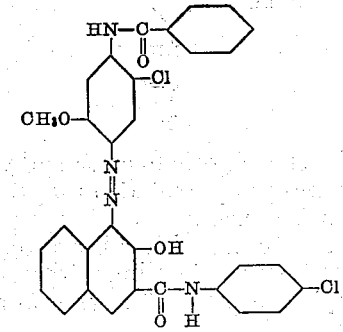

which product forms a dark violet powder yielding, when produced on the fiber, pure violet tints which are distinguished by their vividness and excellent fastness properties, particularly to chlorine and kier boiling.

12. As new products the azo-dyestuffs of the general formula

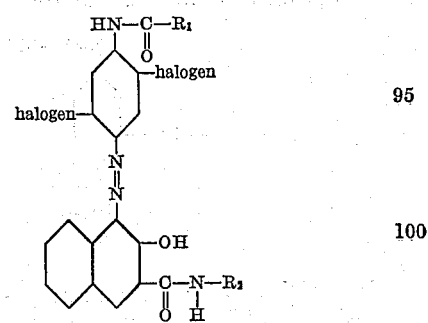

in which $R_1$ stands for an aryl nucleus of the benzene series, and $R_2$ for an aryl nucleus of the benzene or of the naphthalene series, which products form red powders yielding, when produced on the fiber, red tints of great vividness which have excellent fastness properties, particularly to chlorine and kier boiling.

13. As new products the azo-dyestuffs of the general formula

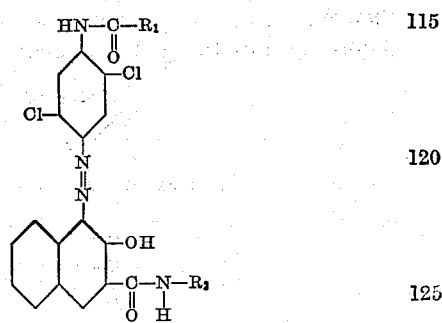

in which $R_1$ stands for an aryl nucleus of the benzene series, and $R_2$ for an aryl nucleus of the benzene or of the naphthalene series, which products form red powders yielding, when produced on the fiber, red tints of great vividness which have excellent fastness properties, particularly to chlorine and kier boiling.

14. As new products the azo-dyestuffs of the general formula

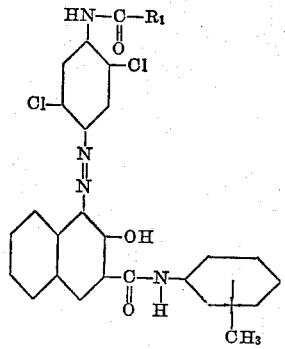

in which $R_1$ stands for an aryl nucleus of the benzene series which products form blue-red powders yielding, when produced on the fiber, blue-red tints of great vividness which have excellent fastness properties, particularly to chlorine and kier boiling.

15. As new products the azo-dyestuffs of the formula

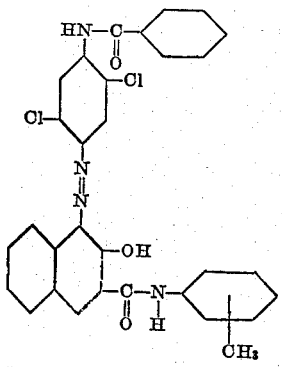

which products form blue-red powders yielding, when produced on the fiber, blue-red tints of great vividness which have excellent fastness properties, particularly to chlorine and kier boiling.

In witness whereof I have hereunto signed my name this 3rd day of July, 1930.

GÉRALD BONHÔTE.